April 15, 1969 C. B. GEIB, JR., ET AL 3,439,240

SELENIUM RECTIFIER

Filed July 29, 1966

INVENTORS
CLARENCE B. GEIB, JR.
GEORGE E. JAMISON
BY JACK N. SCOTT

OSTROLENK, FABER, GERB & SOFFEN
ATTORNEYS

United States Patent Office 3,439,240

Patented Apr. 15, 1969

3,439,240

SELENIUM RECTIFIER

Clarence B. Geib, Jr., Wilmington, George E. Jamison, Los Angeles, and Jack N. Scott, Torrance, Calif., assignors to International Rectifier Corporation, El Segundo, Calif., a corporation of California Filed July 29, 1966, Ser. No. 568,519
Int. Cl. H01l 3/04
U.S. Cl. 317—241 3 Claims

ABSTRACT OF THE DISCLOSURE

A selenium rectifier in which a thin cadmium sulfide-cadmium selenide layer and a thin lacquer layer are disposed between the counter electrode and selenium body.

This invention relates to selenium rectifiers, and more particularly relates to a novel process for forming a novel selenium rectifier structure having in combination a higher forward current density and a higher reverse voltage than heretofore available.

Selenium rectifiers and processes for their manufacture are well known. In a standard selenium rectifier and process for the manufacture thereof, an aluminum base plate, which is nickel-plated, has a selenium layer deposited thereon as by evaporation techniques within a vacuum and the selenium layer is subsequently annealed. Thereafter, a spray metal counter-electrode such as bismuth-cadmium alloy is deposited atop the annealed selenium layer and reverse current is applied through the device in order to cause "forming" of the device during which a cadmium selenide layer is formed between the spray metal counter-electrode and selenium layer.

During this forming process, there will be a gradual increase in the reverse voltage characteristics of the device until some saturation level is reached after a certain length of time. At the same time, forward voltage or forward impedance of the device increases due in part to the heat generated during the forming process. Extensive forming, however, is necessary so that the forward current density (which is a function of forward impedance) of prior art cells is limited by the necessity to reach some minimum commercially acceptable reverse voltage. In the case of the present invention, the amount of work performed on the cell during the forming process is decreased so there is less heat generated whereby the stabilized forward voltage drop is substantially decreased.

Many minor developments have taken place in the fabrication of selenium rectifiers to enhance one or more of its characteristics. For example, it is known that a thin layer of lacquer can be interposed between the selenium layer and the counter-electrode. This thin lacquer layer has been of some assistance in improving the reverse voltage capabilities of the device.

In other prior art processes, the aforementioned lacquer layer has been replaced by a cadmium sulfide-cadmium selenide layer which also was found to permit an increase in the forward current density of the cell. However, relatively low reverse voltage capability cells were available from this modified process.

The present invention is for a novel process which combines various aspects of the prior art processes mentioned above and, in particular, provides the cadmium sulfide and cadmium selenide layer directly atop the selenium layer, thereafter followed by an appliction of an extremely thin lacquer layer on top of the cadimum sulfide and cadmium selenide layer. Thus, the novel process of the invention uses both of the interposed layers previously singly used between the spray metal counter-electrode and the selenium layer.

The use of these two layers, however, has been found to have a vastly improving effect on the forward current density of the device and permits the formation of devices having up to about twice the continuous reverse voltage blocking capabilities of the prior types of selenium cells in a much shorter time with the forward voltage characteristic of the new cell substantially lower than that of prior art cells. Thus, selenium rectifier cells formed by the process of the invention for a given forward voltage drop will have up to twice the reverse voltage capability of the old cells and a forward current conducting ability for a given area which is increased. In particular, the mean yield of current density is increased by from 20 to 40% while reverse voltage is increased by from 20 to 40%.

In addition to the provision of the both interposed layers which were singly used in the prior art, other critical steps were taken during the new process which do not have any substantial effect when these layers are used singly.

It was first found that during the deposition of the selenium on the nickel-plated aluminum base plate higher temperatures should be used than are normally used in the prior art to obtain additional annealing of the selenium layers.

A second modification is in the use of a thicker selenium layer than has been previously used which is believed to cause an increase in the dielectric strength of the device.

A third and important modification is in the use of a more dilute lacquer than has been previously used where the lacquer was used as the single interposed layer between the selenium and counter-electrode.

When the two layers; both a cadmium sulfide-cadmium selenide layer and a lacquer layer are interposed between the selenium layer and its counter-electrode layer, a vastly improved selenium rectifier device is formed, these results being particularly enhanced when the steps mentioned above are taken particularly with regard to increased annealing temperature for the selenium and a more dilute lacquer.

Accordingly, a primary object of this invention is to provide a novel high current density, high reverse voltage selenium rectifier.

Another object of this invention is to provide a novel process for the manufacture of a selenium rectifier which requires a relatively short forming time.

Still another object of this invention is to provide a novel selenium rectifier structure which has an increased reverse voltage characteristic and an increased forward current density characteristic as compared to prior art types of selenium rectifiers.

Still another object of this invention is to provide a novel process for the manufacture of a selenium rectifier which requires a relatively short forming time for obtaining a substantial reverse voltage characteristic without substantially increasing the forward impedance of the selenium rectifier.

Another object of this invention is to provide a novel method of manufacturing for selenium cells which produces uniform forward and reverse voltage characteristics and substantially decreases the number of rejection units.

A further object of this invention is to improve the shelf life of selenium rectifier cells.

These and other objects of this invention will become apparent from the following description when taken in connection with the drawings, in which.

Figure 1:
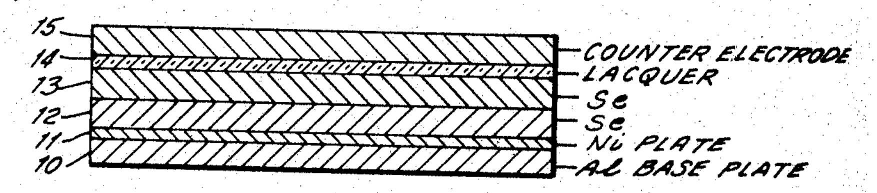
FIG. 1 (PRIOR ART)
FIGURE 1 is a cross-sectional view of a standard prior art type of selenium plate using a lacquer layer interposed between the selenium layer and its counter-electrode with the dimensions being exaggerated for purposes of clarity.

Referring first to FIGURE 1, there is illustrated therein a typical prior art rectifier cell which is formed of an aluminum base plate 10 which has the upper surface thereof sandblasted, and receives a sintered nickel-plated layer 11. Thereafter, a first selenium layer 12 is deposited typically by vacuum deposition processes, and is thereafter passed through a heating cycle to anneal the selenium layer.

A second selenium layer 13 is subsequently deposited on the annealed layer 12 and this too is annealed in a similar manner to the first layer 12. Thereafter, and in accordance with one typical prior art technique, a thin lacquer layer 14 is coated over the surface of selenium 13, and the lacquer is permitted to set. This lacquer layer 14 has a thickness in excess of $1 \times 10^{-5}$ cm. due to its relatively high viscosity.

Finally, a spray metal counter-electrode 15 which typically would be a bismuth and cadmium alloy is deposited on the lacquer layer 14.

This completes the assembly stage of manufacture of the cell of FIGURE 1, and the manufacturing process is completed by an electroforming step in which a fixed current density is forced through the plate in a reverse direction where, during this forming operation, a cadmium selenide layer is formed within the device with the reverse voltage of the device gradually increasing with time. Typically, the forming process can run for as long as three hours with the reverse voltage increasing from approximately 6 to 10 volts RMS to approximately 33 volts RMS in a relatively good cell. However, the forward voltage of the device stabilizes at a relatively high voltage in this process.

Figure 2:
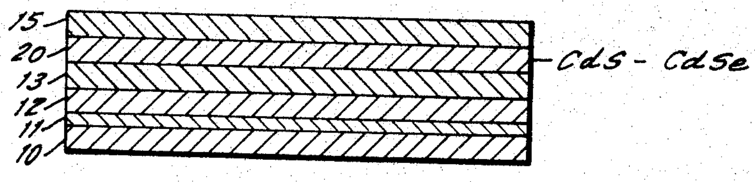
FIG. 2 (PRIOR ART)
FIGURE 2 is a cross-sectional view similar to FIGURE 1 of a second prior art type of arrangement for a selenium rectifier cell in which a cadmium sulfide-cadmium selenide layer is interposed between the selenium and the counter-electrode.

FIGURE 2 shows a second prior art arrangement that has been used which is identical to FIGURE 1 with the components of FIGURE 2 which are similar to those of FIGURE 1 having similar identifying numerals where in FIGURE 2 the lacquer layer 14 of FIGURE 1 has been replaced by a cadmium sulfide-cadmium selenide layer 20 having a thickness of the order of 1500 A.

It was found that when the cadmium sulfide-cadmium selenide layer 20 replaces the lacquer layer 14 in FIGURE 1 somewhat improved forward voltage characteristics are obtained during the forming process with a relatively low reverse voltage of from 26 to 30 volts RMS being reached.

Figure 3:
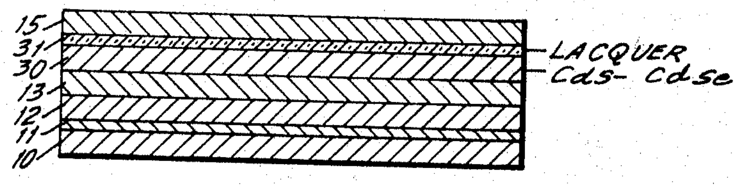
FIGURE 3 is a cross-sectional view of the novel rectifier cell of the present invention shown in cross-section with both a lacquer layer and cadmium sulfide-cadmium selenide layer interposed between the selenium and the counter-electrode.

In accordance with the present invention, and as shown in FIGURE 3, both the lacquer layer and the cadmium sulfide-cadmium selenide layer previously singly used in the prior art are used together, thereby resulting in a wholly unexpected increase in the reverse voltage characteristics of the device after a relatively short forming process. Since a relatively short forming time (approximately 1 hour as compared to from 2 to 3 hours for the prior art arrangement) is required, there is a decreased amount of working of the cell and it stabilizes at a very low forward voltage drop, thereby to yield a rectifier device having a high reverse voltage and a high forward current density.

Referring now to FIGURE 3 where numerals similar to those of FIGURES 1 and 2 identify similar components, it will be seen that the cadmium sulfide-cadmium selenide layer 30 is deposited directly atop the second selenium layer 13, while the thin dilute lacquer layer 31 is deposited directly atop this cadmium sulfide-cadmium selenide layer. Thereafter, the counter-electrode 15 is applied atop the lacquer.

This novel construction per se, when using manufacturing techniques similar to those used in the formation of FIGURES 1 and 2, will by itself produce an improved rectifier structure.

It has, however, been further found desirable to increase the annealing temperatures of selenium layers 12 and 13 to obtain an increased anneal of these layers, and to increase the thickness of these layers from what has been previously used. In addition, it has been found that a thinner lacquer 31 should be used as compared to the lacquer previously used in the prior art device of FIGURE 1. When these additional steps are taken, the resulting device exhibits even greater improvement in the reverse voltage characteristic and in an increase in the forward current density of the device after forming.

Moreover, the novel arrangement of the invention has been found to provide more uniform manufacturing results in that the devices will have a more uniform forward and reverse voltage drop, thereby resulting in a lower rejection rate in the manufacturing process.

Finally, the device has been found to have a substantially improved shelf life for both its forward and reverse voltage characteristics.

*Example*

In the manufacturing process for manufacturing a cell such as that of FIGURE 3, a large aluminum sheet which could have dimensions, for example, of 12 inches x 48 inches, and a thickness in the range of 0.008 inch to 0.040 inch, is first sandblasted on the upper surface thereof, and is conventionally nickel-plated with a nickel-plate 11 which could have a thickness of the order of 20 microns. Other plating materials such as iron, bismuth, cobalt and mixtures thereof could also be used.

Thereafter, this entire plate is placed in a suitable vacuum deposition chamber in which the first selenium layer 12 is deposited on the plate by evaporation and condensation to a thickness of from 2.5 to 4.0 mils. Preferably, this first selenium layer will contain chlorine in the amount of 220 parts per million.

During the deposition process, a partial annealing occurs in the selenium where the selenium changes from the amorphous form to the crystalline form. The temperature of the sheet during the evaporation cycle, therefore, begins the control of the crystal structure of the selenium layer and the general tendencies of the forward and reverse characteristic. The relatively high halogen content will aid in the conductivity characteristics.

During the evaporation of the selenium which provides good initial annealing action of the first selenium layer, the sheet temperature is increased from 50° C. at the beginning of the deposition cycle and reaches a maximum of from 170° C. to 190° C. after about 18 minutes. A sheet temperature of 120° C. should be reached about the time at which selenium evaporation begins from the selenium boiler. After the peak sheet temperature of from 170 to 190° C. is reached, the sheet temperature is decreased toward a temperature in the range of 150° to 170° C. at about 35 minutes in the time cycle at which point the oven vacuum is broken and the sheet is removed to cool to room temperature.

The sheet is next subjected to a first annealing cycle and is placed in an oven with the sheet temperature, as measured by a thermocouple in contact with the sheet, in the range of from 212 to 214° C. for 12 to 17 minutes.

After this annealing process, the second selenium layer 13 is deposited atop the annealed layer 12 in a similar deposition apparatus used for the deposition of layer 12 where, however, the second selenium layer 13 will have a thickness of approximately 1/10 of the thickness of the first layer 12. Thus, the second selenium layer 13 will have a thickness of from 0.3 to 0.4 mil with a low halogen content of approximately 35 parts per million of chlorine being mixed into the second selenium layer.

During this second selenium deposition, the sheet in the deposition chamber is brought to a temperature of from 85° to 90° C. within 3 to 5 minutes, and is thereafter permitted to drop to about 70° C. at 12 minutes in the cycle, at which time the vacuum is broken and the sheet is again removed and permitted to cool to room temperature.

The second layer is thereafter annealed by quickly bringing the sheet temperature to within about 1 degree of the melting point of selenium (217° C.) for about 2¼ minutes. Thus, the second layer is annealed without materially affecting the first selenium layer. This has been found to substantially improve the reverse voltage capabilities of the device.

After the annealing of the second selenium layer 13, and in accordance with the invention, an evaporated barrier layer of cadmium sulfide and cadmium selenide 30 is evaporated in a suitable evaporation apparatus onto the upper surface of layer 13 to a thickness of approximately 1500° A. The ratio of cadmium selenide to cadmium sulfide is from 10 to 1 to 2 to 1, with optimum results in regard to plate stability obtained with a ratio of from 5 to 1.

This evaporation can be accomplished by the simultaneous evaporation of cadmium sulfide and cadmium selenide from a distillant having a temperature of approximately 750° C. with the temperature increased slowly to 770° C. to avoid spattering.

During this evaporation, the temperature of base sheet 10 is controlled so that the temperature is increased from room temperature at time zero to a maximum temperature in the range of 65° to 85° C. after a time of approximately 12 minutes.

The increase of oven temperature is discontinued after about 6 minutes, and the temperature increase is permitted to "coast" up to the peak of 65° to 85° C.

During this evaporation, it is important to control ambient humidity, preferably below 30% relative humidity. In addition, there should be as short a time lapse as possible between the second annealing operation, the evaporation barrier layer operation and the subsequent application of lacquer and counter-electrode.

After the evaporation operation, the lacquer layer 31 is applied atop the cadmium sulfide-cadmium selenide barrier layer 30.

Prior to the application of the lacquer layer, however, it is useful to cut the 12 x 48 inch sheet into smaller sections which can be more easily handled particularly during the subsequent lacquer spinning cycle. Thus, the sheets can be stamped or cut to convenient sizes or to the sizes of the ultimate plates prior to the lacquer application process.

In accordance with the invention, a more dilute lacquer is used than has been used in the prior art. In particular, extremely good results have been had with a lacquer having the following composition by weight:

| | Percent |
|---|---|
| p-Phenylenediamine | 0.5 |
| Nitrocellulose base 1020C (available from Horn & Jeffrys) | 5.0 |
| Cellulose acetate | 47.25 |
| Acetone | 47.25 |

The cellulose acetate and acetone are used as solvents and could, of course, be replaced by other suitable solvents. The p-phenylenediamine is believed to have a substantial effect in stabilizing the forward voltage characteristics of the device, while the cellulose component appears to promote the reverse voltage characteristics of the device.

A small drop of this lacquer solution is then applied to the individual plate, and the plate is then rapidly spun in a suitable spinning jig until all excessive lacquer has been removed. At this point, a lacquer thickness of the order of $10^{-5}$ to $10^{-6}$ cm. in thickness will be deposited atop layer 30.

Thereafter, the spray metal counter-electrode 15 is applied on top of the lacquer layer 31, and can be a bismuth-cadmium alloy having a 58–42% mixture which is sprayed on to lacquer layer 31 to a thickness of from 2½ to 4 mils. The lacquer layer, used in conjunction with the cadmium sulfide-cadmium selenide layer promotes forming, as stated above. This results in a smaller increase in forward voltage drop during forming and yields a cell capable of reverse ratings of the order of 45 volts RMS and forward voltage ratings up to 1.3 amperes/square inch.

The final step in the process of the manufacture of the plate of FIGURE 3 is then the electroforming process in which the completed plates are connected in a suitable electrical fixture which has suitable current regulation means associated therewith for supplying a predetermined current through the plate in the reverse current conduction direction of the plate, regardless of the change in reverse voltage characteristics of the plate.

Thus, a suitable regulation circuit is provided which will supply from 50 to 100 milliamperes per square inch for plates connected in the fixture in a reverse direction through the plates.

During this electroforming process, suitable cooling means such as water cooled mounting plates are provided to maintain cell temperature below 110° F.

Figure 4:
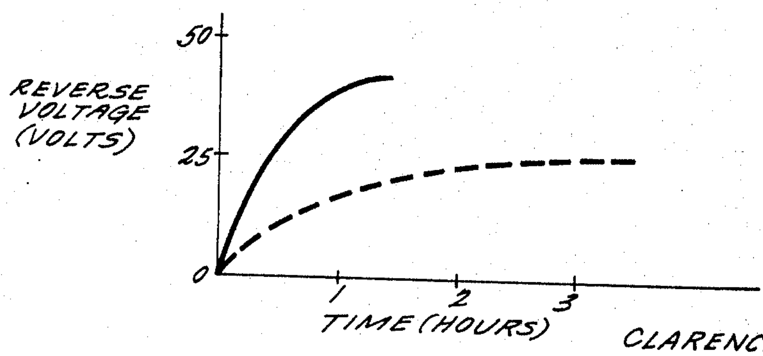
FIGURE 4 illustrates the forming characteristic of rectifier cells manufactured in accordance with the invention as contrasted to the forming characteristics of the prior art devices shown in dotted lines.

FIGURE 4 shows the typical forming characteristic for the novel plates of FIGURE 3 in solid lines as contrasted to the forming characteristics of the prior art plates in dotted lines. Thus, in FIGURE 4 and in the past, during the electroforming process, the plates will assume a reverse voltage of approximately 25 volts RMS after approximately 3 hours of electroforming by a reverse current of approximately 150 to 200 milliamperes per square inch.

In accordance with the invention, however, the plates of FIGURE 3 are found to form as shown in the solid line of FIGURE 4 where the reverse voltage approaches approximately 50 volts RMS after only approximately 1 hour.

As a further advantage of the novel process, it has been also found that the plates formed are more consistent in their characteristics and the rate of rework plates has been decreased from 30% to approximately 5%. In addition, reject rate decreased from 5–6% to 3%. Moreover, the shelf life of the plates formed by the novel process is substantially improved in both forward and reverse voltage characteristics.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A selenium rectifier cell; said selenium rectifier cell comprising a metallic base plate; an annealed layer of selenium atop said metallic base plate; a layer of cadmium sulfide and cadmium selenide atop said selenium layer; a layer of a lacquer material atop said layer of cadmium sulfide and cadmium selenide, and a layer of a spray metal counter-electrode atop said lacquer layer; said lacquer layer having a thickness of from $1\times10^{-5}$ to $1\times10^{-6}$ centimeters; said cadmium sulfide-cadmium selenide layer having a thickness of approximately 1500 A.

2. The rectifier cell of claim 1 which includes a layer of material selected from the group including iron, nickel, cobalt, bismuth and mixtures thereof interposed between said aluminum base plate and said selenium layer and a second selenium layer interposed between said selenium layer and said layer of cadmium sulfide and cadmium selenide; said second selenium layer having a thickness of approximately one-tenth the thickness of said selenium layer.

3. The rectifier cell of claim 1 wherein said lacquer includes an amine and a cellulose base.

References Cited

UNITED STATES PATENTS

| | | | |
|---|---|---|---|
| 2,892,136 | 6/1959 | Escoffery | 317—241 |
| 2,806,984 | 9/1957 | Koch | 317—241 |
| 2,881,371 | 4/1959 | Caldwell | 317—241 |

JOHN W. HUCKERT, *Primary Examiner.*

M. EDLOW, *Assistant Examiner.*

U.S. Cl. X.R.

317—234, 237